UNITED STATES PATENT OFFICE.

HANS BRUN LANDMARK, OF DRAMMEN, NORWAY.

PROCESS OF PRECIPITATING ORGANIC SUBSTANCES IN SULFITE LIQUOR.

1,236,948. Specification of Letters Patent. Patented Aug. 14, 1917.

No Drawing. Application filed December 7, 1916. Serial No. 135,694.

*To all whom it may concern:*

Be it known that I, HANS BRUN LANDMARK, a subject of the King of Norway, residing at Drammen, have invented certain new and useful Improvements in Processes of Precipitating Organic Substances in Sulfite Liquor, of which the following is a specification.

As is well known sulfite liquor contains organic substances, the so called lignin substances, which are bound to sulfonic acids. In order to precipitate said organic substances the liquor may be heated under pressure with a stronger acid, for example, sulfuric acid, which causes the lignin sulfonic acids to be decomposed while $SO_2$ is being liberated. By a pressure of 6 to 7 atmospheres all of the organic substances comprised under lignins are practically precipitated. This process has however no practical value as the quantity of acid—at least 2% of the volume of the liquid—which has to be added, is so large that the cost is quite out of proportion to the value of the organic substances precipitated.

Sulfite liquor contains free sulfurous acid which by oxidation may be converted into sulfuric acid. The sulfuric acid thus produced decomposes an equivalent quantity of sulfonic acid bound to lignin substances. The hereby liberated sulfurous acid is further oxidized into sulfuric acid which again decomposes fresh quantities of lignin sulfonic acid. This process is carried out according to a method invented by Strehlenert. According to said method oxidation takes place by means of air or oxygen at a pressure of about 20 atmospheres and a temperature of about 200° C. Only at such a high pressure and such a high temperature $SO_2$ is oxidized into $SO_3$. Said condition must therefore be maintained during the whole precipitating process, whereas the decomposition of the lignin sulfonic acid combinations, when sufficient acid is at hand, takes place at 6 to 7 atmospheres.

Experiments show that it is possible to work advantageously at this latter pressure, or that it is possible at this pressure to bring about oxidation.

If for instance peroxid of hydrogen is introduced into an autoclave containing sulfite liquor at a pressure of 6 to 7 atmospheres the free sulfurous acid is oxidized and the above described precipitation is obtained. By means of oxygen in "reactionable" condition the $SO_2$ of the liquor may thus be oxidized to $SO_3$ at a pressure, which makes precipitation of the lignin substances possible at about 7 atmospheres.

The direct use of peroxid of hydrogen would of course be too uneconomic.

My invention consists in a new process consisting in that I produce the "reactionable" oxygen or active oxygen within the autoclave itself, having previously placed the latter under a pressure of for instance 7 atmospheres by pumping into it oxygen or air and then letting electric sparks pass through the gas.

A variation of the process consists in that I also introduce into the autoclave ozonized oxygen or ozonized air at the pressure and temperature most favorable for the process.

Having thus described the invention, what I claim is:—

1. That process of precipitating organic substances in sulfite liquor, which is characterized by decomposing the organic sulfonic acid compositions contained in said liquor, by means of a stronger acid; oxidizing the sulfurous acid by the discharge of electric sparks in the presence of a suitable oxidizing medium; and maintaining the liquor under suitable pressure during the process.

2. The process of precipitating organic substances in sulfite liquor, which is characterized by decomposing the organic sulfonic acid combinations, contained in said liquor, by means of sulfonic acid, produced by the oxidation of the $SO_2$ contained in said liquor, by the discharge of electric sparks in the presence of a suitable oxidizing medium within the vessel in which the liquor is under pressure, and in which the precipitation takes place.

3. The process of precipitating organic substances in sulfite liquor, which is characterized by decomposing the organic sulfonic acid combinations, contained in said liquor, by means of sulfuric acid, produced by the oxidation of the $SO_2$ contained in the said liquor, by the discharge of electric sparks in the presence of air or oxygen within the vessel in which the liquor is under pressure, and in which the precipitation takes place.

4. The process of precipitating organic substances in sulfite liquor, which is characterized by decomposing the organic sulfonic acid combinations, contained in said liquor, by means of sulfuric acid, produced by the oxidation of the $SO_2$ contained in the said liquor, by the discharge of electric sparks in the presence of ozonized oxygen or ozonized air within the vessel in which the liquor is under pressure, and in which the precipitation takes place.

In testimony whereof I affix my signature in presence of two witnesses.

HANS BRUN LANDMARK.

Witnesses:
  YOH. NIELSEN,
  E. GUNDERSOEN.

It is hereby certified that in Letters Patent No. 1,236,948, granted August 14, 1917, upon the application of Hans Brun Landmark, of Drammen, Norway, for an improvement in "Processes of Precipitating Organic Substances in Sulfite Liquor," an error appears in the printed specification requiring correction as follows: Page 1, line 91, claim 2, for the word "sulfonic" read *sulfuric;* and that the said Letters Patent should be read with this correction therein that the same may conform to the record of the case in the Patent Office.

Signed and sealed this 4th day of September, A. D. 1917.

[SEAL.] R. F. WHITEHEAD,

*Acting Commissioner of Patents.*

Cl. 252.